US012771106B2

(12) United States Patent
Liu

(10) Patent No.: US 12,771,106 B2
(45) Date of Patent: Oct. 20, 2026

(54) ACTIVE PANEL COVER AND LAMP WITH PANEL COVER

(71) Applicant: Guangzhou Jiguang Lighting Co., Ltd., Guangzhou (CN)

(72) Inventor: Xiaoli Liu, Guangzhou (CN)

(73) Assignee: Guangzhou Jiguang Lighting Co., Ltd., Guangzhou (CN)

( * ) Notice: Subject to any disclaimer, the term of this patent is extended or adjusted under 35 U.S.C. 154(b) by 221 days.

(21) Appl. No.: 18/661,747

(22) Filed: May 13, 2024

(65) Prior Publication Data

US 2024/0297488 A1 Sep. 5, 2024

(51) Int. Cl.

| | |
|---|---|
| ***H02G 3/14*** | (2006.01) |
| ***F21S 9/02*** | (2006.01) |
| ***F21V 23/00*** | (2015.01) |
| ***F21V 23/04*** | (2006.01) |
| ***H02G 3/08*** | (2006.01) |
| *F21Y 103/00* | (2016.01) |
| *F21Y 115/10* | (2016.01) |

(52) U.S. Cl.

CPC ................ *H02G 3/14* (2013.01); *F21S 9/022* (2013.01); *F21V 23/004* (2013.01); *F21V 23/04* (2013.01); *H02G 3/081* (2013.01); *F21Y 2103/00* (2013.01); *F21Y 2115/10* (2016.08)

(58) Field of Classification Search

CPC ............ H02G 3/14; H02G 3/081; H02G 3/18; H02G 3/12; H02G 3/088; H01R 25/006; F21V 23/004; F21V 23/04; F21S 9/022; F21Y 2103/00; F21Y 2115/10

USPC ................................................. 174/66, 67 W

See application file for complete search history.

(56) References Cited

U.S. PATENT DOCUMENTS

| | | | | |
|---|---|---|---|---|
| 9,997,860 | B1 * | 6/2018 | Hernandez, Jr. | H01R 25/006 |
| 2009/0196058 | A1 | 8/2009 | Ishida et al. | |
| 2011/0147037 | A1 * | 6/2011 | Tee | H02G 3/14 29/428 |
| 2013/0265694 | A1 | 10/2013 | Texter | |
| 2014/0083759 | A1 * | 3/2014 | Gagne | H02G 3/086 174/480 |
| 2017/0222417 | A1 * | 8/2017 | Smith | H05B 45/00 |
| 2018/0241146 | A1 * | 8/2018 | Smith | H01R 13/7135 |
| 2018/0303002 | A1 * | 10/2018 | Liao | H01R 13/665 |
| 2018/0358788 | A1 | 12/2018 | Grendahl | |

* cited by examiner

*Primary Examiner* — Roshn K Varghese

(74) *Attorney, Agent, or Firm* — Hemisphere Law, PLLC

(57) ABSTRACT

The present application provides an active panel cover and a lamp with a panel cover. The active panel cover includes a panel cover main body. The panel cover main body is provided with a through hole for exposing jacks on a socket. The panel cover main body is provided with at least one clip on two sides of the through hole. Each clip includes a protective panel and a conductive sheet. The protective panel is arranged on the panel cover main body. The protective panel is elastic. The conductive sheet is embedded onto the protective panel. The conductive sheet is provided with a conductive protrusion. The conductive protrusion protrudes out of an outer side of the protective panel.

15 Claims, 8 Drawing Sheets

ACTIVE PANEL COVER AND LAMP WITH PANEL COVER

TECHNICAL FIELD

The present disclosure relates to the technical field of cover plates, and in particular, to an active panel cover and a lamp with a panel cover.

BACKGROUND

At present, an opening is formed in an active panel cover to expose a socket; two conductive elastic sheets are arranged at a bottom of the active panel cover; the two conductive elastic sheets are located on two sides of the opening; and the two conductive elastic sheets are used to take electricity from the socket for elements on the active panel cover.

At present, an existing active panel cover, such as an active cover plate No. US20140054059A1, structurally includes two conductive elastic sheets that are directly exposed to the air, so that a user easily touches the two conductive elastic sheets during use, causing a risk of electric shock.

SUMMARY

The present disclosure mainly aims to provide an active panel cover and a lamp with a panel cover, so as to solve the problem of a potential hazard of electric shock because two conductive elastic sheets in an existing active panel cover are easily touched by a user.

In order to solve the technical problem, the technical scheme provided by the present disclosure is as follows.

In a first aspect, the present application provides an active panel cover, including a panel cover main body, wherein the panel cover main body is provided with a through hole for exposing jacks on a socket; the panel cover main body is provided with at least one clip on two sides of the through hole;

each clip includes a protective panel and a conductive sheet; the protective panel is arranged on the panel cover main body; the protective panel is elastic; the conductive sheet is embedded onto the protective panel; the conductive sheet is provided with a conductive protrusion; and the conductive protrusion protrudes out of an outer side of the protective panel.

Further, the panel cover main body is provided with first gaps on two sides of the protective panel, and one side of each first gap is a first opening.

Further, an insertion sliding chute is arranged on the protection panel, and the conductive sheet is placed in the insertion sliding chute.

Further, a circumferential side of the protective panel is raised to form a reinforcing strip; one side of the reinforcing strip close to the conductive protrusion protrudes to form a surrounding edge; the insertion sliding chute is enclosed by the protective panel, the reinforcing strip, and the surrounding edge; and the reinforcing strip extends to the first gaps and is located on peripheral sides of the first gaps.

Further, the panel cover main body includes a first cover plate and a second cover plate; the protective panel and the first gaps are located on the second cover plate; and the first cover plate is connected to the second cover plate to limit the conductive sheet.

Further, at least one first limiting pillar is arranged on the first cover plate; the conductive sheet includes a first sheet body and a second sheet body connected and perpendicular to the first sheet body; the conductive protrusion is located on the second sheet body; the first sheet body is located between the first cover plate and the second cover plate; the second sheet body is arranged in the insertion sliding chute;

an insertion hole is formed in the first sheet body; and the first limiting pillar is arranged in the insertion hole.

Further, the second cover plate is provided with a second limiting pillar at a position corresponding to the first limiting pillar, and an insertion slot is arranged on the second limiting pillar; one end of the first limiting pillar is arranged in the insertion slot;

the first cover plate protrudes out of a circumferential side of the through hole to form a boss; and upper and lower surfaces of the first sheet body respectively abut against the boss and the second limiting pillar.

Further, there are four first limiting pillars is four, which are distributed at four endpoints of a square; there are four insertion slots; and each first limiting pillar is arranged in one insertion slot.

Further, the protective panel is integrally injection-molded with the second cover plate.

Further, at least a portion of a side surface of the conductive protrusion away from the protective panel is a plane.

Further, a distance between the protective panels in two opposite clips gradually decreases in a direction away from the first cover plate.

Further, there is one or more through hole.

In a second aspect, the present disclosure also discloses a lamp with a panel cover, including the active panel cover described above, wherein the first cover plate is connected to the second cover plate to form a accommodating chamber; a control circuit board and a light-emitting unit for emitting light are arranged in the accommodating chamber; the light-emitting unit is electrically connected to the control circuit board; and the control circuit board is connected to the conductive sheet through a wire.

Further, the lamp with the panel cover further includes an adapter circuit board and a light guide strip for exporting light; the light-emitting unit is arranged on the adapter circuit board; and the light guide strip is arranged at a position corresponding to the light-emitting unit.

Further, the accommodating chamber is internally provided with a partition; the partition separates the accommodating chamber into a first space and a second space; a second gap is formed between one end of the partition and a side wall of the first cover plate;

the partition is located on one side of the control circuit board away from the conductive sheet; the adapter circuit board passes through the second gap; a portion of the adapter circuit board is located in the first space; a portion of the adapter circuit board is located in the second space; the first sheet body and the control circuit board are both located in the first space; the light guide strip is located in the second space; the first cover plate is provided with a second opening at a position corresponding to the light guide strip; and the light-emitting unit is located on one side of the partition away from the control circuit board.

Further, a size of the second space is matched with a size of the light guide strip.

Further, a battery connected to the control circuit board is further arranged in the accommodating chamber, and the battery is located in the first space and between the adapter circuit board and the control circuit board.

Further, when the conductive sheet does not output current to the control circuit board, the control circuit board takes electricity from the battery.

Further, a function button is arranged on the control circuit board; the first cover plate is provided with a third opening at a position corresponding to the function button; and a pressing piece of the function button is arranged in the third opening.

Further, the first cover plate is connected to the second cover plate by a screw;

the control circuit board is provided with at least three via holes; the first cover plate is provided with third limiting pillars at positions corresponding to the via holes; and the third limiting pillars are arranged in the via holes.

The present disclosure has the beneficial effects below: Compared with the prior art, in this embodiment, the conductive sheet is embedded into the elastic protective panel to wrap around the protective panel by side surfaces, such as a back surface, two sides, and a top, of the conductive sheet. Therefore, when a user assembles the active panel cover of this embodiment onto the socket, the user can be effectively prevented from touching the conductive sheet, thereby effectively lowering the risk of electric shock.

BRIEF DESCRIPTION OF THE DRAWINGS

To describe the technical solutions in the embodiments of the present disclosure more clearly, the following briefly introduces the accompanying drawings for describing the embodiments. The accompanying drawings in the following description show merely some embodiments of the present utility model, and a person of ordinary skill in the art may still derive other drawings from the accompanying drawings without creative efforts.

DETAILED DESCRIPTION OF THE EMBODIMENTS

Figure 1:
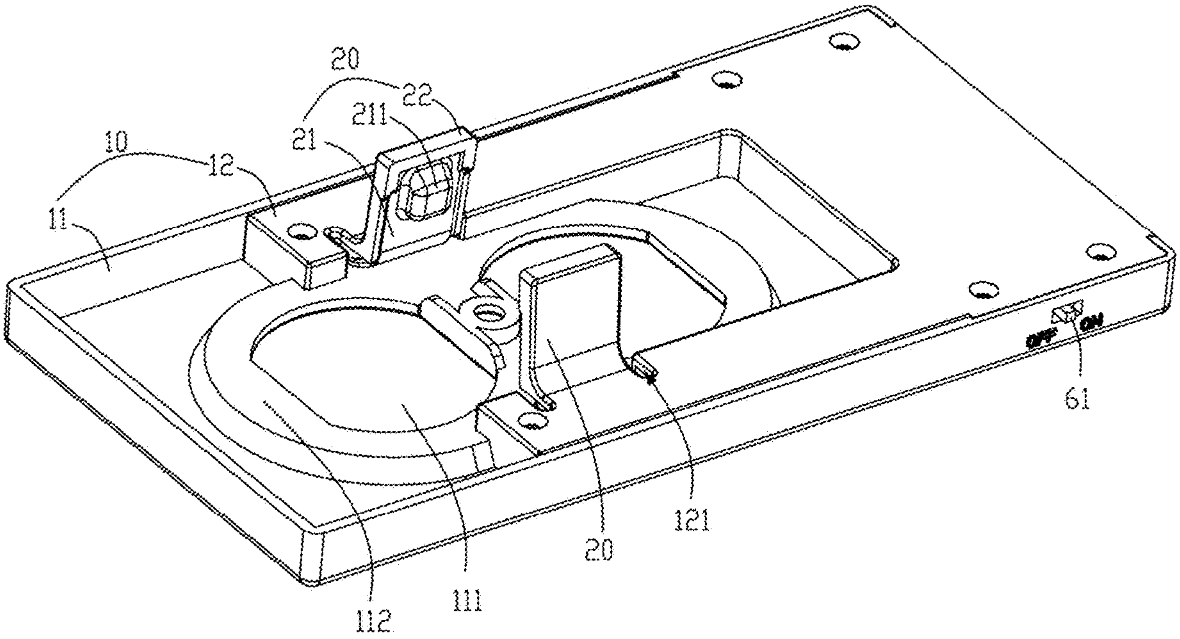
FIG. 1 is a three-dimensional diagram of an active panel cover according to the present disclosure.
Figure 2:
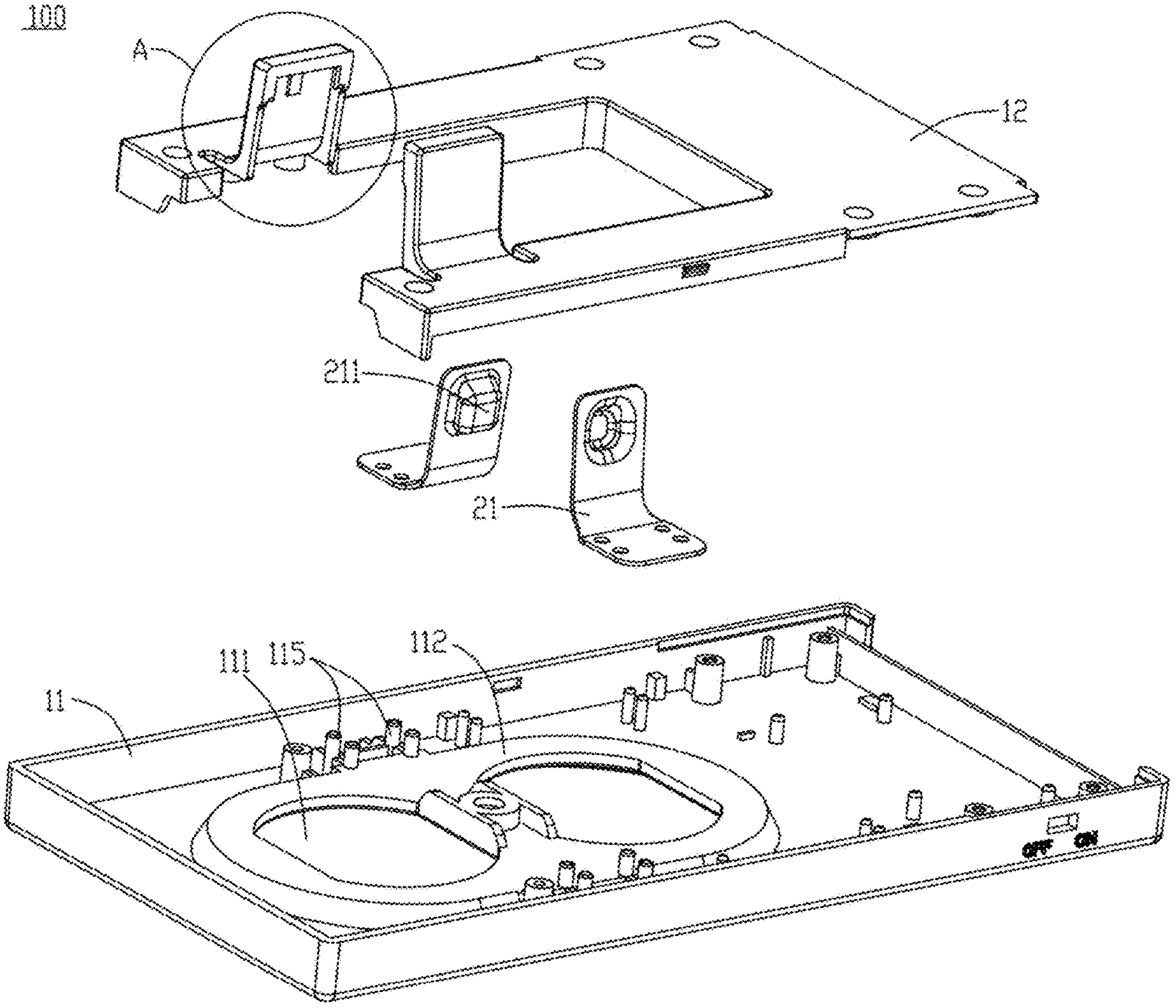
FIG. 2 is an exploded view of an active panel cover according to the present disclosure.
Figure 3:
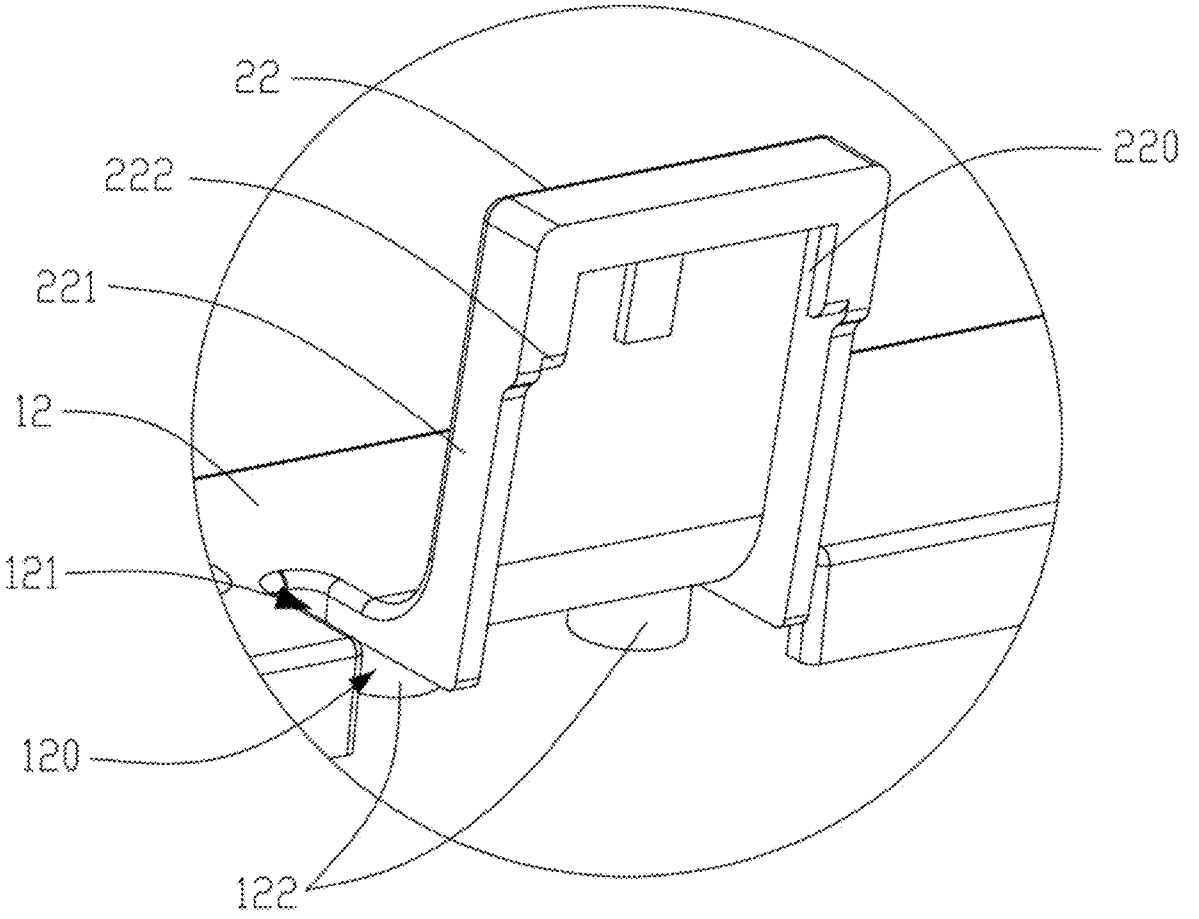
FIG. 3 is an enlarged view of the region A of the active panel cover in FIG. 2.
Figure 4:
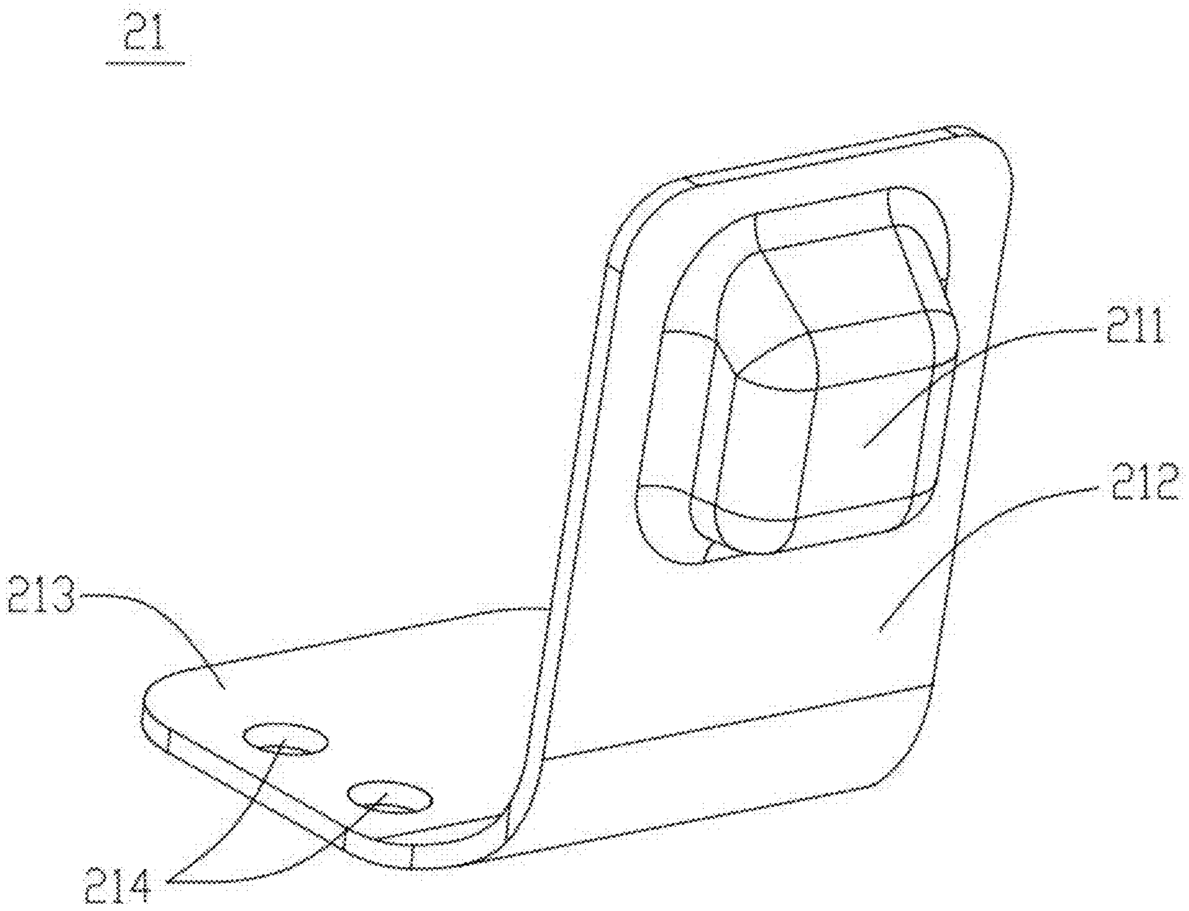
FIG. 4 is a structural diagram of a conductive sheet in an active panel cover according to the present disclosure.
Figure 5:
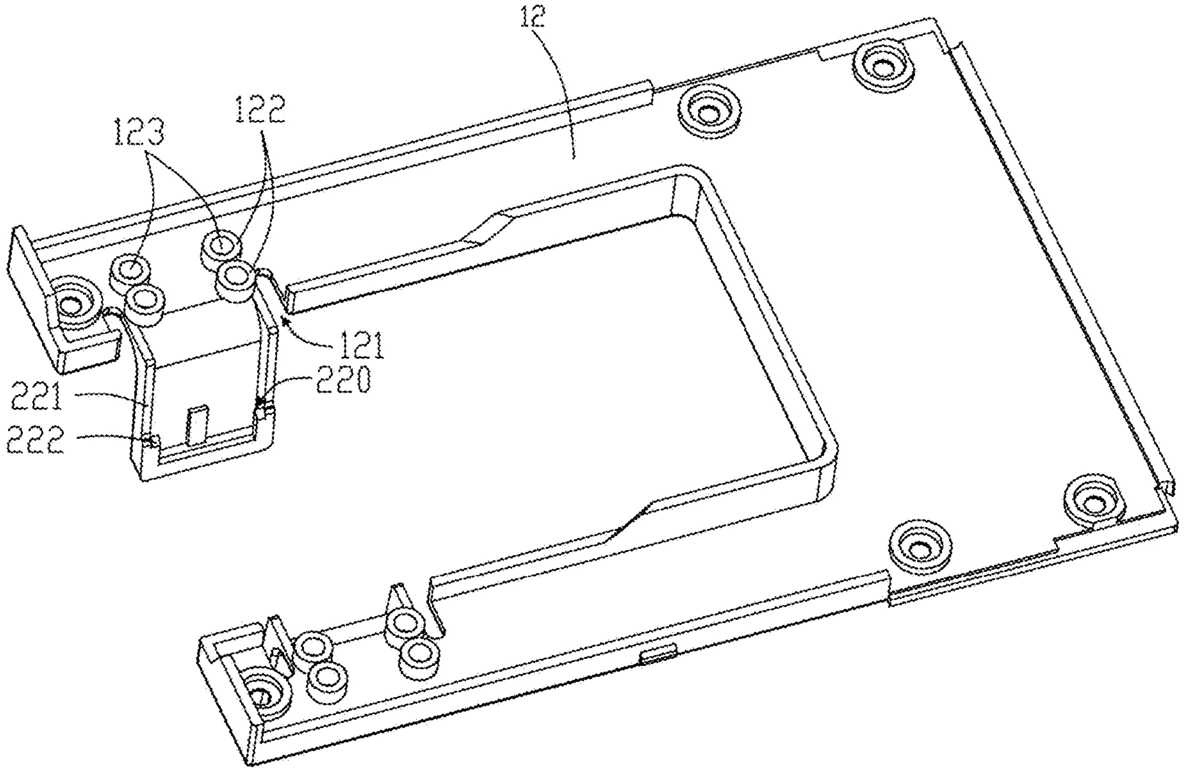
FIG. 5 is a structural diagram of a second cover plate in an active panel cover according to the present disclosure.

Referring to FIG. 1 to FIG. 5, the embodiments of the present disclosure provides an active panel cover.

The active panel cover includes a panel cover main body 10, wherein the panel cover main body 10 is provided with a through hole 111 for exposing jacks on a socket; the panel cover main body 10 is provided with at least one clip 20 on two sides of the through hole 111. Each clip 20 includes a protective panel 22 and a conductive sheet 21; the protective panel 22 is arranged on the panel cover main body 10; the protective panel 22 is elastic; the conductive sheet 21 is embedded onto the protective panel 22; the conductive sheet 21 is provided with a conductive protrusion 211; and the conductive protrusion 211 protrudes out of an outer side of the protective panel 22.

In this embodiment, the clips 20 located on the two sides of the through hole 111 are used to clamp the active panel cover of this embodiment onto a socket. In this embodiment, the conductive sheet 21 is embedded into the elastic protective panel 22 to wrap around the protective panel 22 by side surfaces, such as a back surface, two sides, and a top, of the conductive sheet 21. Therefore, when a user assembles the active panel cover of this embodiment onto the socket, the user can be effectively prevented from touching the conductive sheet, thereby effectively lowering the risk of electric shock.

Specifically, in the above embodiment, the protective panel 22 is made of an insulation material.

In an embodiment, the panel cover main body 10 is provided with first gaps 121 on two sides of the protective panel 22, and one side of each first gap 121 is a first opening 120. Thus, the protective panel 22 is elastic. By cooperation with the conductive sheet 21, the socket can be clamped from the two sides of the through hole 111, so as to fix the active panel cover of this embodiment on the socket, and jacks of the socket can be exposed through the through hole 111, without affecting the use of the socket.s In an embodiment, an insertion sliding chute 220 is arranged on the protection panel 22, and the conductive sheet 21 is placed in the insertion sliding chute 220. In the prior art, one side of the sliding chute is generally an opening, so that the conductive sheet 21 can be conveniently placed in the insertion sliding chute 220.

In the above embodiment, a circumferential side of the protective panel 22 is raised to form a reinforcing strip 221; one side of the reinforcing strip 221 close to the conductive protrusion 211 protrudes to form a surrounding edge 222; and the insertion sliding chute 220 is enclosed by the protective panel 22, the reinforcing strip 221, and the surrounding edge 222.

Specifically, the reinforcing strip 221 extends to the first gaps 121 and is located on peripheral sides of the first gaps 121 to enlarge a connection area between the protective panel 22 and the panel cover main body 10 and improve the intensity of the protective panel 22.

In the above embodiment, the panel cover main body 10 includes a first cover plate 11 and a second cover plate 12; the protective panel 22 and the first gaps 121 are located on the second cover plate 12; and the first cover plate 11 is connected to the second cover plate 12 to limit the conductive sheet 21, so as to fix the conductive sheet 21 and facilitate the production and manufacturing of the active panel cover of this embodiment.

The first cover plate 11 is connected to the second cover plate 12 by a screw. Of course, in other embodiments, the first cover plate 11 may also be connected to the second cover plate 12 by a buckle, ultrasonic lamination, and the like.

In an embodiment, at least one first limiting pillar 115 is arranged on the first cover plate 11; the conductive sheet 21 includes a first sheet body 213 and a second sheet body 212 connected and perpendicular to the first sheet body 213; the conductive protrusion 211 is located on the second sheet body 212; the first sheet body 213 is located between the first cover plate 11 and the second cover plate 12; the second sheet body 212 is arranged in the insertion sliding chute 220. An insertion hole 214 is formed in the first sheet body 213; and the first limiting pillar 115 is arranged in the insertion hole 214. In this way, the first sheet body 213 can be prevented from shifting in a horizontal direction, thus enabling the second sheet body 212 to cooperate with the protective panel 22 to achieve the elasticity.

In an embodiment, the second cover plate 12 is provided with a second limiting pillar 122 at a position corresponding to the first limiting pillar 115*s*, and an insertion slot 123 is arranged on the second limiting pillar 122; one end of the first limiting pillar 115 is arranged in the insertion slot 123; the first cover plate 11 protrudes out of a circumferential side of the through hole 111 to form a boss 112; and upper and lower surfaces of the first sheet body 213 respectively abut against the boss 112 and the second limiting pillar 122. By use of the boss 112 and the second limiting pillar 122, it is possible to prevent the first sheet body 213 from shifting in a thickness direction of the active panel cover in this embodiment, thus further fixing the conductive sheet 21.

In an embodiment, there are four first limiting pillars 115 is four, which are distributed at four endpoints of a square. There are four insertion slots 123; and each first limiting pillar 115 is arranged in one insertion slot 123, so as to effectively limit the position of the first sheet body 213. Of course, in other embodiments, there may also be one, two, three, five, or more first limiting pillars 115, and a cross section of the first limiting pillar 115 may be square, trapezoid, circular, and the like.

In an embodiment, the number of the protective panel 22 is the same as the number of the conductive sheet 21. Each conductive sheet 21 is embedded in one protective panel 22, that is, each conductive sheet 21 corresponds to one protective panel 22 for use, so that each conductive sheet 21 is allowed to be embedded in the protective panel 22.

In an embodiment, the protective panel 22 is integrally injection-molded with the second cover plate 12, so as to facilitate the production of the active panel cover of this embodiment.

In an embodiment, a distance between the protective panels 22 in two opposite clips 20 gradually decreases in a direction away from the first cover plate 11, so that there is a clamping force between the two opposite clips 20 to clamp the active panel cover of this embodiment on the socket.

In an embodiment, at least a portion of a side surface of the conductive protrusion 211 away from the protective panel 22 is a plane. When the active panel cover is clamped on the socket, the plane on the conductive protrusion 211 is used to enlarge a contact area between the conductive protrusion 211 and a conductive member on the socket, thereby improving the stability of electrical connection.

In an embodiment, there is one or more through holes 111, so that a user can select an adaptive active panel cover according to the number of jacks on the socket.

Based on the active panel cover described above, this embodiment further provides a lamp with a panel cover.

Figure 6:
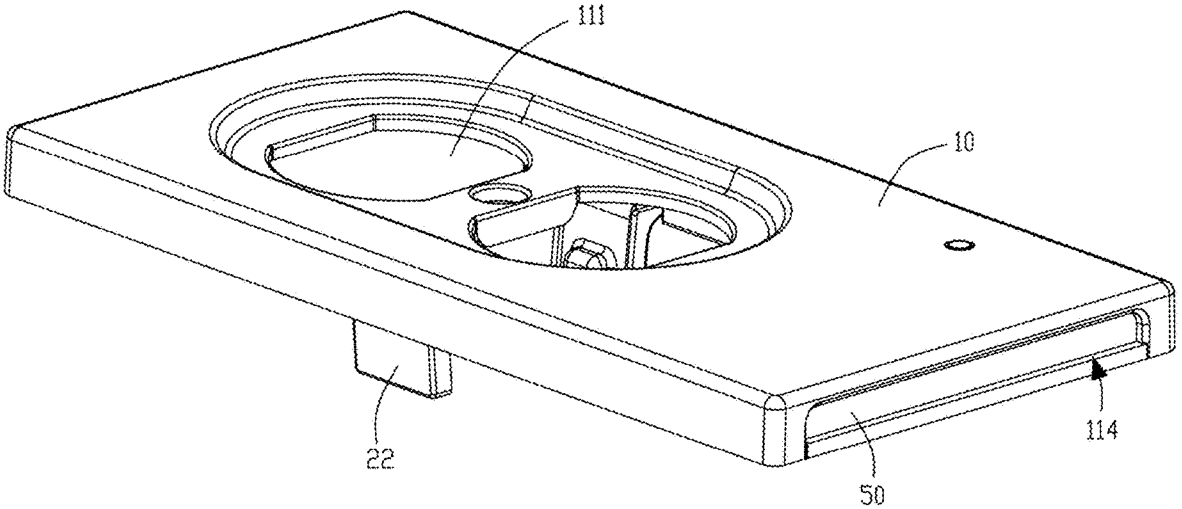
FIG. 6 is a three-dimensional diagram of a lamp with a panel cover according to the present disclosure.
Figure 7:
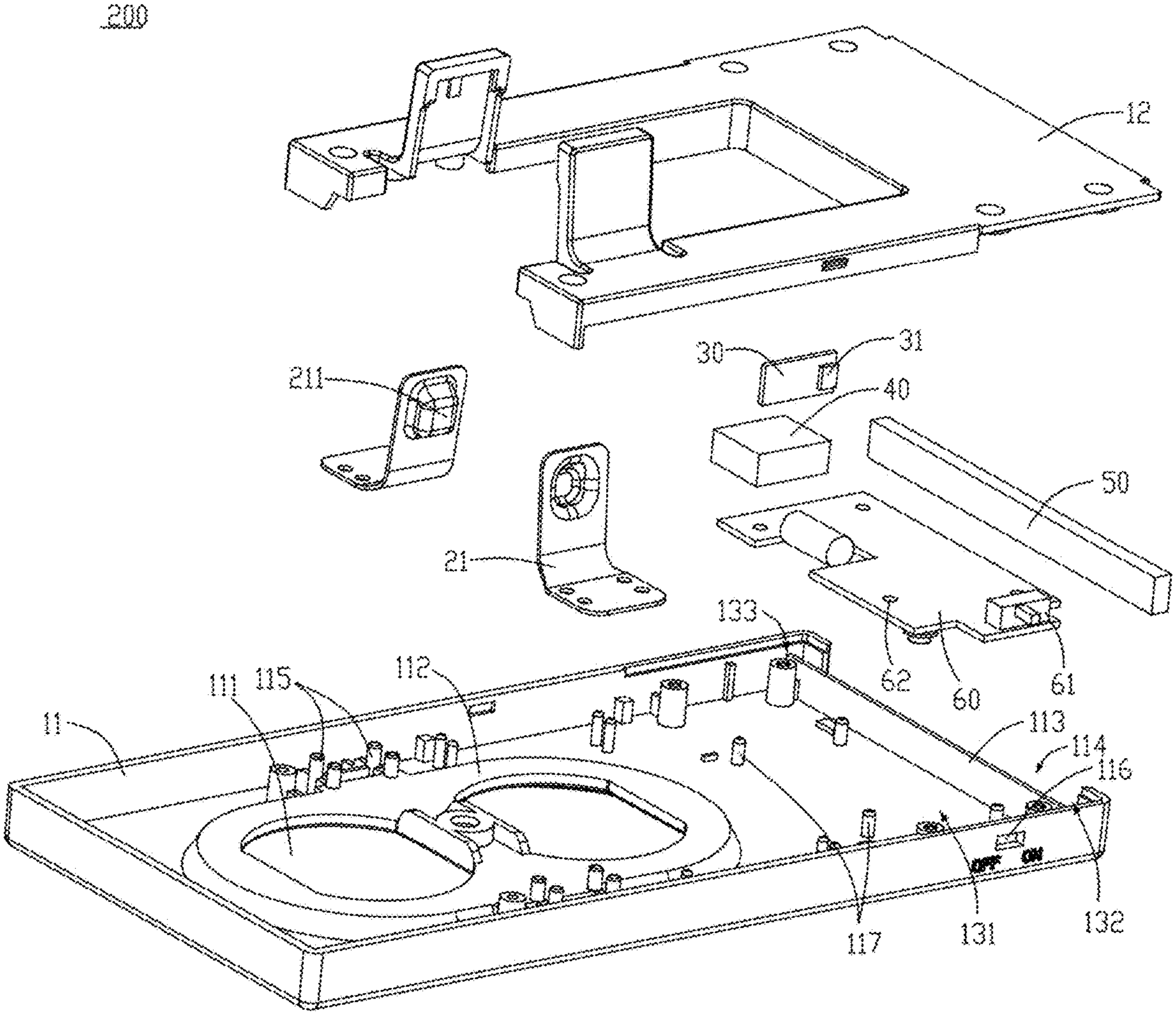
FIG. 7 is an exploded view of a lamp with a panel cover according to the present disclosure.
Figure 8:
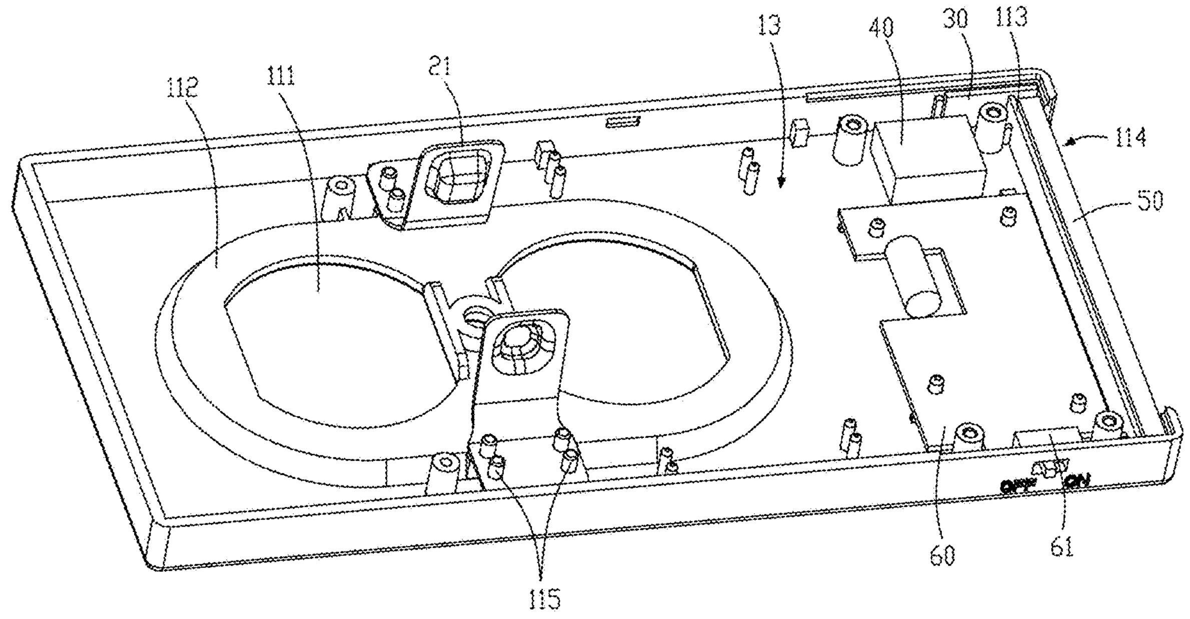
FIG. 8 is a structural diagram of a lamp with a panel cover, without a second cover plate, according to the present disclosure.

Referring to FIG. 6 to FIG. 8, the lamp with a panel cover includes the active panel cover described above. The first cover plate 11 is connected to the second cover plate 12 to form a accommodating chamber 13; a control circuit board 60 and a light-emitting unit 31 for emitting light are arranged in the accommodating chamber 13; the light-emitting unit 31 is electrically connected to the control circuit board 60; and the control circuit board 60 is connected to the conductive sheet 21 through a wire.

In this embodiment, the light-emitting unit 31 is configured in the first cover plate 11 and the second cover plate 12, so that the light-emitting unit 31 can be turned on to play an illumination role in a dark environment, and can also serve as a small night lamp at night.

In an embodiment, the lamp with the panel cover further includes an adapter circuit board 30 and a light guide strip 50 for exporting light; the light-emitting unit 31 is arranged on the adapter circuit board 30; and the light guide strip 50 is arranged at a position corresponding to the light-emitting unit 31. The light guide strip 50 is used to export the light of the light-emitting unit 31, so that the emitted light is softer, and dazzling can be prevented; and a user can use the lamp when sleeping at night. Furthermore, by the use of the light guide strip 50, an illumination area of the light can also be enlarged.

In an embodiment, the accommodating chamber 13 is internally provided with a partition 113; the partition 113 separates the accommodating chamber 13 into a first space 131 and a second space 132; a second gap 133 is formed between one end of the partition 113 and a side wall of the first cover plate 11; the partition 113 is located on one side of the control circuit board 60 away from the conductive sheet 21; the adapter circuit board 30 passes through the second gap 133; a portion of the adapter circuit board 30 is located in the first space 131; a portion of the adapter circuit board 30 is located in the second space 132; the first sheet body 213 and the control circuit board 60 are both located in the first space 131; the light guide strip 50 is located in the second space 132; the first cover plate 11 is provided with a second opening 114 at a position corresponding to the light guide strip 50; and the light-emitting unit 31 is located on one side of the partition 113 away from the control circuit board 60.

Specifically, the light-emitting unit 31 may be a light-emitting diode (LED) surface-mounted lamp, an LED, or the like. The second opening 114 is located at a top of the lamp with the panel cover, so that when the lamp with the panel cover is mounted on the socket, the light can exit from the top of the lamp with the panel cover. Of course, the second opening 114 may also be located at a bottom, a side surface, or the like of the lamp with the panel cover, and the position of the second opening 114 is not limited here.

In an embodiment, a size of the second space 132 is matched with a size of the light guide strip 50, so as to fix the light guide strip 50.

In an embodiment, a battery 40 connected to the control circuit board 60 is further arranged in the accommodating chamber 13, and the battery 40 is located in the first space 131 and between the adapter circuit board 30 and the control circuit board 60. The battery 40 may be used to supply power to the control circuit board 60, and the light-emitting unit 31 may be powered via the control circuit board 60, so as to drive the light-emitting unit 31 to emit light.

In an embodiment, when the conductive sheet 21 does not output current to the control circuit board 60, the control circuit board 60 takes electricity from the battery 40. When the lamp with the panel cover is fixed on the socket, the conductive sheet 21 takes electricity from the socket and supplies the input power to the control circuit board 60. In case of power outage or in another state, if there is no power input to the socket, the control circuit board 60 controls the battery 40 to output electric energy for use by the light-emitting unit 31.

Specifically, the battery 40 may be a rechargeable battery 40, which means that when the lamp with the panel cover is fixed on the socket, the conductive sheet 21 takes electricity from the socket, and the battery 40 may also be charged via the control circuit board 60. Of course, in other embodiments, the battery 40 may also be a dry battery 40 that is non-rechargeable.

In an embodiment, a function button 61 is arranged on the control circuit board 60; the first cover plate 11 is provided with a third opening 116 at a position corresponding to the function button 61; and a pressing piece of the function button 61 is arranged in the third opening 116. When the function button 61 is operated, the light-emitting unit 31 may be turned on or turned off via the control circuit board 60, or a light-emitting mode of the light-emitting unit 31 may be adjusted. Specifically, the function button 61 may be a push button, a toggle switch, or the like.

In an embodiment, the control circuit board 60 is provided with at least three via holes 62; the first cover plate is provided with third limiting pillars 117 at positions corresponding to the via holes 62; and the third limiting pillars 117 are arranged in the via holes 62. Due to the connection between the first cover plate 11 and the second cover plate 12, the control circuit board 60 is fixed, thereby reducing the configuration of screws and facilitating the mounting of the control circuit board 60 of this embodiment.

It should be noted that all directional indications (such as up, down, left, right, front, back . . . ) in the embodiments of the present disclosure are only used to explain a relative positional relationship between components, motion situations, etc. at a certain specific attitude (as shown in the figures). If the specific attitude changes, the directional indication also correspondingly changes.

In addition, the descriptions of "first", "second", etc. in the present disclosure are only used for descriptive purposes, and cannot be understood as indicating or implying its relative importance or implicitly indicating the number of technical features indicated. Therefore, features defined by "first" and "second" can explicitly instruct or impliedly include at least one feature. In addition, "and/or" in the entire text includes three solutions. A and/or B is taken as an example, including technical solution A, technical solution B, and technical solutions that both A and B satisfy. In addition, the technical solutions between the various embodiments can be combined with each other, but it needs be based on what can be achieved by those of ordinary skill in the art. When the combination of the technical solutions is contradictory or cannot be achieved, it should be considered that such a combination of the technical solutions does not exist, and is not within the scope of protection claimed by the present disclosure.

The above descriptions are only preferred embodiments of the present disclosure, and are not intended to limit the patent scope of the present disclosure. Any equivalent structural transformation made by using the content of the specification and the drawings of the present disclosure under the invention idea of the present disclosure, directly or indirectly applied to other related technical fields, shall all be included in the scope of patent protection of the present disclosure.

What is claimed is:

1. An active panel cover, comprising a panel cover main body, wherein the panel cover main body is provided with a through hole; the panel cover main body is provided with at least one clip on two sides of the through hole;

each clip comprises a protective panel and a conductive sheet; the protective panel is arranged on the panel cover main body; the protective panel is elastic; the conductive sheet is embedded onto the protective panel; the conductive sheet is provided with a conductive protrusion; and the conductive protrusion protrudes out of an outer side of the protective panel;

wherein the panel cover main body is provided with first gaps on two sides of the protective panel, and one side of each first gap is a first opening;

wherein the panel cover main body comprises a first cover plate and a second cover plate; the protective panel and the first gaps are located on the second cover plate; and the first cover plate is connected to the second cover plate to limit the conductive sheet;

wherein at least one first limiting pillar is arranged on the first cover plate; the conductive sheet comprises a first sheet body and a second sheet body connected and perpendicular to the first sheet body; the conductive protrusion is located on the second sheet body; the first sheet body is located between the first cover plate and the second cover plate; the second sheet body is arranged in the insertion sliding chute;

an insertion hole is formed in the first sheet body; and the first limiting pillar is arranged in the insertion hole;

wherein the second cover plate is provided with a second limiting pillar at a position corresponding to the first limiting pillar, and an insertion slot is arranged on the second limiting pillar; one end of the first limiting pillar is arranged in the insertion slot;

the first cover plate protrudes out of a circumferential side of the through hole to form a boss; and upper and lower surfaces of the first sheet body respectively abut against the boss and the second limiting pillar.

2. The active panel cover according to claim 1, wherein an insertion sliding chute is arranged on the protection panel, and the conductive sheet is placed in the insertion sliding chute.

3. The active panel cover according to claim 2, wherein a circumferential side of the protective panel is raised to form a reinforcing strip; one side of the reinforcing strip close to the conductive protrusion protrudes to form a surrounding edge; the insertion sliding chute is enclosed by the protective panel, the reinforcing strip, and the surrounding edge; and the reinforcing strip extends to the first gaps and is located on peripheral sides of the first gaps.

4. The active panel cover according to claim 1, wherein there are four first limiting pillars is four, which are distributed at four endpoints of a square; there are four insertion slots; and each first limiting pillar is arranged in one insertion slot.

5. The active panel cover according to claim 1, wherein the protective panel is integrally injection-molded with the second cover plate.

6. The active panel cover according to claim 1, wherein at least a portion of a side surface of the conductive protrusion away from the protective panel is a plane.

7. The active panel cover according to claim 6, wherein a distance between the protective panels in two opposite clips gradually decreases in a direction away from the first cover plate.

8. The active panel cover according to claim 1, wherein there is one or more through hole.

9. A lamp with a panel cover, comprising an active panel cover, the active panel cover, comprising a panel cover main body, wherein the panel cover main body is provided with a through hole; the panel cover main body is provided with at least one clip on two sides of the through hole;

each clip comprises a protective panel and a conductive sheet; the protective panel is arranged on the panel cover main body; the protective panel is elastic; the conductive sheet is embedded onto the protective panel; the conductive sheet is provided with a conductive protrusion; and the conductive protrusion protrudes out of an outer side of the protective panel;

wherein the panel cover main body is provided with first gaps on two sides of the protective panel, and one side of each first gap is a first opening;

wherein the panel cover main body comprises a first cover plate and a second cover plate; the protective panel and the first gaps are located on the second cover plate; and the first cover plate is connected to the second cover plate to limit the conductive sheet;

wherein the first cover plate is connected to the second cover plate to form an accommodating chamber; a control circuit board and a light-emitting unit for emitting light are arranged in the accommodating chamber; the light-emitting unit is electrically connected to the control circuit board; and the control circuit board is connected to the conductive sheet through a wire;

the lamp further comprising an adapter circuit board and a light guide strip for exporting light; the light-emitting unit is arranged on the adapter circuit board; and the light guide strip is arranged at a position corresponding to the light-emitting unit.

10. The lamp with the panel cover according to claim 9, wherein the accommodating chamber is internally provided with a partition; the partition separates the accommodating chamber into a first space and a second space; a second gap is formed between one end of the partition and a side wall of the first cover plate;

the partition is located on one side of the control circuit board away from the conductive sheet; the adapter circuit board passes through the second gap; a portion of the adapter circuit board is located in the first space; a portion of the adapter circuit board is located in the second space; the first sheet body and the control circuit board are both located in the first space; the light guide strip is located in the second space; the first cover plate is provided with a second opening at a position corresponding to the light guide strip; and the light-emitting unit is located on one side of the partition away from the control circuit board.

11. The lamp with the panel cover according to claim 10, wherein a size of the second space is matched with a size of the light guide strip.

12. The lamp with the panel cover according to claim 10, wherein a battery connected to the control circuit board is further arranged in the accommodating chamber, and the battery is located in the first space and between the adapter circuit board and the control circuit board.

13. The lamp with the panel cover according to claim 12, wherein when the conductive sheet does not output current to the control circuit board, the control circuit board takes electricity from the battery.

14. The lamp with the panel cover according to claim 10, wherein a function button is arranged on the control circuit board; the first cover plate is provided with a third opening at a position corresponding to the function button; and a pressing piece of the function button is arranged in the third opening.

15. The lamp with the panel cover according to claim 14, wherein the first cover plate is connected to the second cover plate by a screw;

the control circuit board is provided with at least three via holes; the first cover plate is provided with third limiting pillars at positions corresponding to the via holes; and the third limiting pillars are arranged in the via holes.

* * * * *